(12) United States Patent
Benjamin et al.

(10) Patent No.: US 11,300,078 B2
(45) Date of Patent: Apr. 12, 2022

(54) VARIABLE THRUST CATAPULT

(71) Applicant: AMI Industries, Inc., Colorado Springs, CO (US)

(72) Inventors: Jeff Benjamin, Colorado Springs, CO (US); Matthew D. Salois, Vacaville, CA (US)

(73) Assignee: AMI Industries, Inc., Colorado Springs, CO (US)

( * ) Notice: Subject to any disclaimer, the term of this patent is extended or adjusted under 35 U.S.C. 154(b) by 284 days.

(21) Appl. No.: 16/747,420

(22) Filed: Jan. 20, 2020

(65) Prior Publication Data
US 2021/0222650 A1 Jul. 22, 2021

(51) Int. Cl.
*F02K 9/80* (2006.01)
*F02K 9/62* (2006.01)
*B64D 25/10* (2006.01)

(52) U.S. Cl.
CPC ............... *F02K 9/80* (2013.01); *B64D 25/10* (2013.01); *F02K 9/62* (2013.01)

(58) Field of Classification Search
CPC .............. F02K 9/80; F02K 9/62; B64D 25/10
See application file for complete search history.

(56) References Cited

U.S. PATENT DOCUMENTS

| | | | | |
|---|---|---|---|---|
| 3,180,593 A | * | 4/1965 | Martin | B64D 25/10 244/122 AE |
| 3,807,670 A | * | 4/1974 | Sutter | B64D 25/10 244/122 AB |
| 4,673,147 A | * | 6/1987 | Solomonides | B64D 25/10 244/122 A |
| 4,706,909 A | * | 11/1987 | Cuevas | B64D 25/10 244/122 AC |
| 4,846,421 A | | 7/1989 | Trikha | |
| 6,591,602 B1 | | 7/2003 | Ruff | |

* cited by examiner

*Primary Examiner* — Justin M Benedik
(74) *Attorney, Agent, or Firm* — Snell & Wilmer L.L.P.

(57) ABSTRACT

A rocket catapult assembly for an ejection seat may comprise a drive motor, a metering tube, a first cartridge, and a second cartridge. The metering tube may include an outer wall having a gas pervious section and a gas impervious section. The drive motor may be configured to translate the metering tube and align the gas pervious section or gas impervious section with a first cartridge and a second cartridge to produce a desired thrust of the rocket catapult assembly.

20 Claims, 9 Drawing Sheets

VARIABLE THRUST CATAPULT

FIELD

The present disclosure relates to escape systems, and more specifically, to variable thrust catapults for multi weight occupants.

BACKGROUND

Ejection systems are designed to expel pilots from an aircraft cockpit. Ejection seats in high performance aircraft benefit from safely removing the pilot or other occupant from the disabled aircraft across a wide variety of aircraft speed regimes, altitudes and aircraft attitudes. Occupants of aircrafts may be various weights ranging from a relatively light weight individual to a relatively heavy individual, which may prevent a single amount of force of thrust to propel an occupant out an aircraft from being desirable.

SUMMARY

A rocket catapult assembly for use in an ejection seat system of an aircraft is disclosed herein. The rocket catapult assembly may comprise: a drive motor including a drive shaft; a metering tube coupled to the drive shaft, the metering tube including an outer wall having a gas pervious section and a gas impervious section; a first cartridge disposed radially outward of the metering tube; a second cartridge disposed axially adjacent to the first cartridge; and a separation disk disposed between the first cartridge and the second cartridge.

In various embodiments, the rocket catapult assembly may further comprise a mortar inner case defining a chamber, wherein the drive motor is configured to translate the drive shaft and the metering tube along an axis defined by a centerline of the mortar inner case. The gas pervious section may be disposed adjacent to the first cartridge and the gas impervious section may be disposed adjacent to the second cartridge in a first configuration, and the gas pervious section may be disposed adjacent to the first cartridge and the second cartridge in a second configuration. The first configuration may correspond to a first thrust of the rocket catapult assembly, wherein the second configuration corresponds to a second thrust of the rocket catapult assembly, and wherein the second thrust is greater than the first thrust. The first cartridge may be in fluid communication with the chamber in the first configuration, and the second cartridge may be fluidly isolated from the chamber in the first configuration. The rocket catapult assembly may further comprise an igniter coupled to the first cartridge. The first cartridge and the second cartridge may be annular in shape.

An aircraft ejection seat system is disclosed herein. The aircraft ejection seat system may comprise: a seat pan; a seat back coupled to the seat pan; and a rocket catapult assembly coupled to the seat back, the rocket catapult assembly comprising: a mortar assembly comprising a mortar outer casing and a mortar inner casing extending from a proximal end to a distal end, the mortar inner casing defining a chamber; a drive motor including a drive shaft; a metering tube coupled to the drive shaft, the metering tube including an outer wall having a gas pervious section and a gas impervious section, wherein the metering tube is configured to alter a thrust of the rocket catapult assembly based on an axial alignment of the metering tube.

In various embodiments, the aircraft ejection seat system may further comprise: a first cartridge disposed radially outward of the metering tube; a second cartridge disposed axially adjacent to the first cartridge; and a separation disk disposed between the first cartridge and the second cartridge. The aircraft ejection seat system may further comprise a display switch configured to be in a first position and a second position, wherein the display switch is configured to create a first electrical connection and align the gas pervious section with the first cartridge and the gas impervious section with the second cartridge in response to being in the first position, wherein the display switch is configured to create a second electrical connection and align the gas pervious section with the first cartridge and the second cartridge in response to being in the second position. The aircraft ejection seat system may further comprise a load cell coupled to the seat pan. The aircraft ejection seat system may further comprise a controller in electrical communication with the load cell and the drive motor. The controller may be configured to align the gas pervious section with the first cartridge only when a weight below a first threshold weight is measured by the load cell. The controller may be configured to align the gas pervious section with the first cartridge and the second cartridge when the weight is measured by the load cell as being above a second threshold weight, wherein the second threshold weight is greater than the first threshold weight. The aircraft ejection seat system may further comprise a third cartridge disposed axially adjacent to the second cartridge. The aircraft ejection seat system may further comprise a breech, the drive motor coupled to the breech.

A method of controlling an operating pressure of a rocket catapult assembly for an ejection seat of an aircraft is disclosed herein. The method may comprise: compressing a load cell disposed in a seat pan of the ejection seat; aligning a gas pervious section of an outer wall of a metering tube with a first cartridge, the first cartridge disposed radially outward from the metering tube; and aligning a gas impervious section of the outer wall of the metering tube with a second cartridge in response to the load cell measuring a weight below a first weight threshold.

In various embodiments, the method may further comprise aligning the gas pervious section with the first cartridge and the second cartridge in response to the weight being above the first weight threshold. The method may further comprise aligning the gas impervious section a third cartridge in response to the weight being above the first weight threshold and below a second weight threshold. The method may further comprise aligning the gas pervious section with the first cartridge, the second cartridge, and the third cartridge in response to the weight being above the second weight threshold.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

A variable thrust rocket catapult assembly for use in an aircraft ejection system is disclosed herein. The variable thrust catapult assembly comprises at least a first cartridge and a second cartridge. The first cartridge is configured to provide a first thrust to rocket catapult assembly and second cartridge is configured to provide a second thrust to rocket catapult assembly. The first thrust is substantially equal to the second thrust. The combined first cartridge and the second cartridge are configured to provide a greater thrust to rocket catapult assembly compared to the first cartridge only or the second cartridge only. The aircraft ejection system may use manually selection of which cartridges to use (i.e., a switch selecting an occupant's weight), or the aircraft ejection system may automatically select which cartridges to use (i.e., a sensor in communication with drive motor to align a metering tube with various cartridges).

Figure 1A:
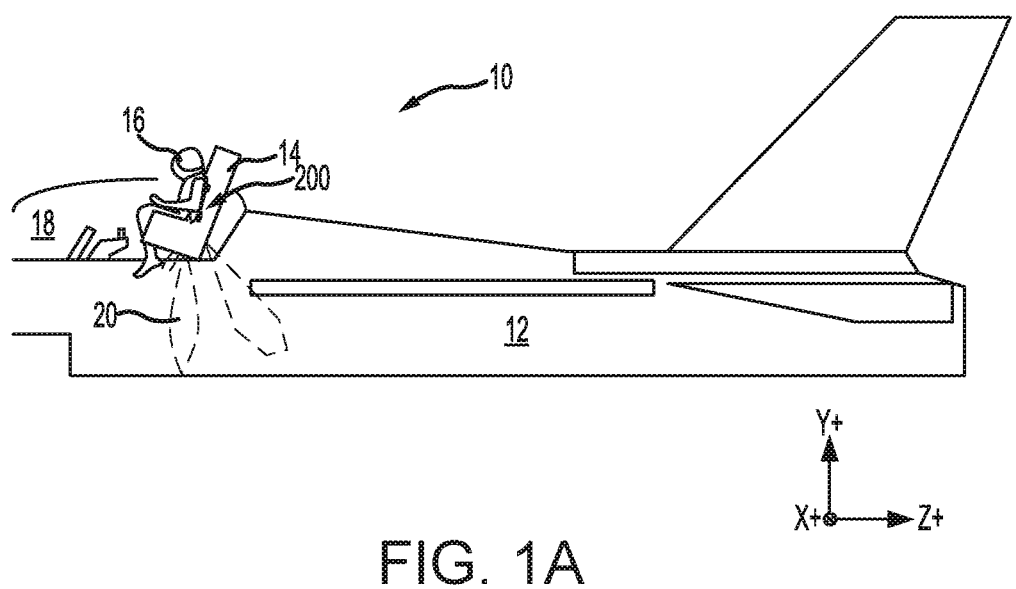
FIG. 1A illustrates an aircraft ejection system, in accordance with various embodiments.

With reference to FIG. 1A, an aircraft ejection system 10 is shown, in accordance with various embodiments. Aircraft ejection system 10 may be installed in aircraft 12 to expel an ejection seat 14 and an occupant 16 of ejection seat 14 from a cockpit 18 of aircraft 12. Ejection seat 14 may be urged from cockpit 18 by a propulsion system 20. In accordance with various embodiments, ejection seat 14 includes rocket catapult assembly 200. Rocket catapult assembly 200 may comprise an element of propulsion system 20 and be configured to extract the ejection seat 14 from cockpit 18.

Figure 1B:
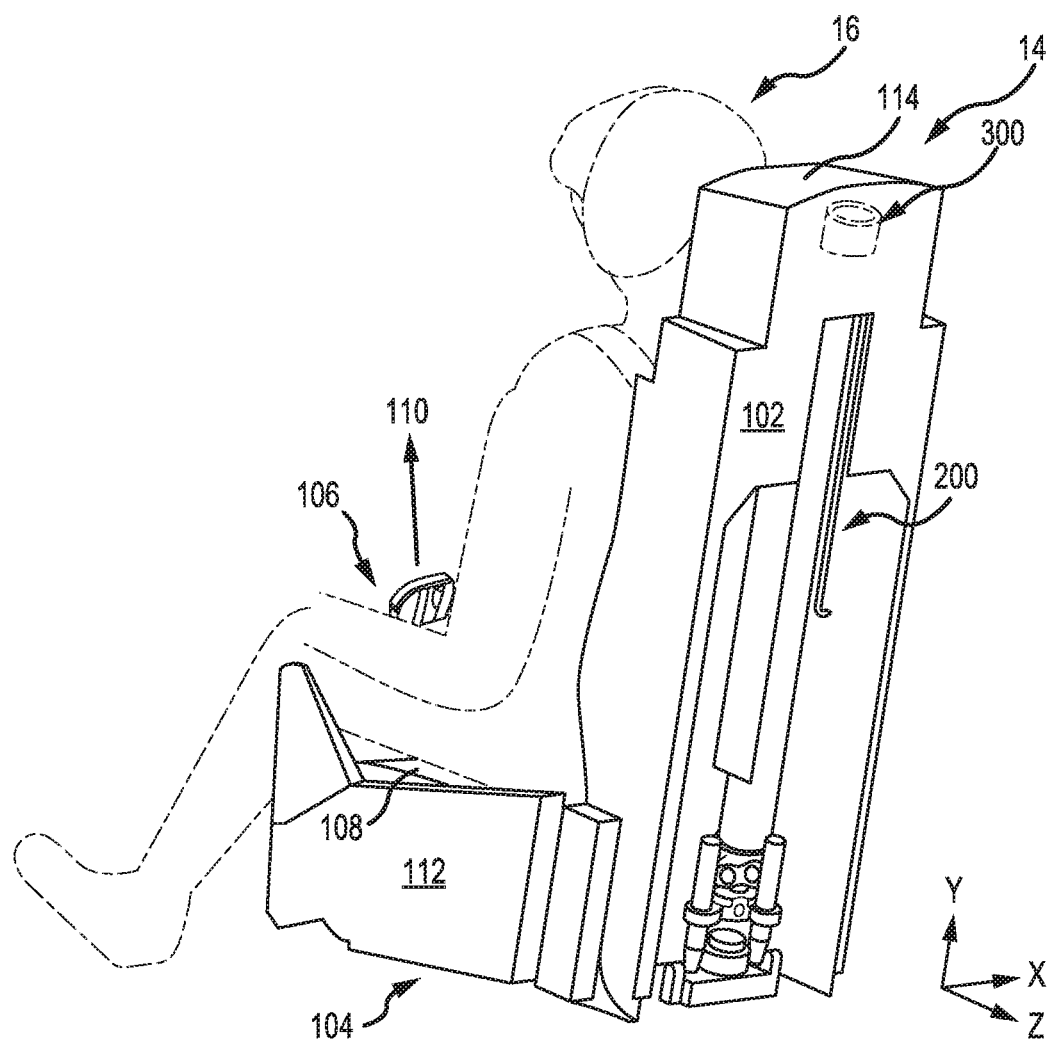
FIG. 1B illustrates an ejection seat having a catapult system in an inactive state, in accordance with various embodiments.

With additional reference to FIG. 1B, ejection seat 14 is illustrated with rocket catapult assembly 200 in an inactive state, in accordance with various embodiments. Ejection seat 14 includes a seat back 102 and a seat pan 108. The rocket catapult assembly 200 is coupled to seat back 102. In various embodiments, an ejection handle 106 may be located proximate a seat bucket 104 of seat pan 108. Seat bucket 104 of seat pan 108 is generally opposite, or distal, seat back 102. While FIG. 13 shows ejection handle 106 located at seat bucket 104 of seat pan 108, it is further contemplated and understood that ejection handle 106 may be located anywhere that is accessible to an occupant of ejection seat 14. For example, ejection handle 106 may be located on a side 112 of seat pan 108 or a headrest 114 of seat back 102.

Figure 2:
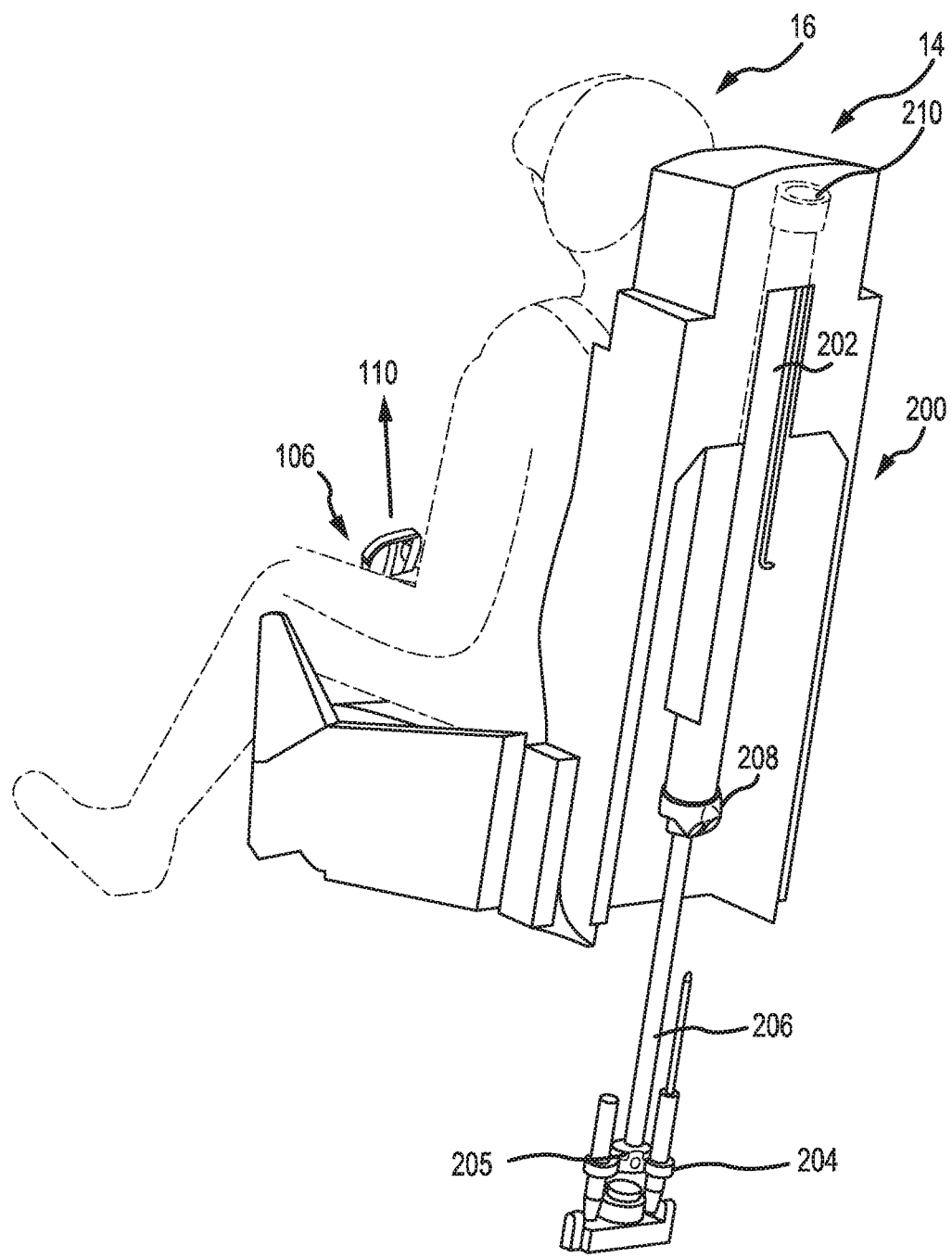
FIG. 2 illustrates an ejection seat having a catapult system in an active state, in accordance with various embodiments.

With additional reference to FIG. 2, ejection seat 14 is illustrated with rocket catapult assembly 200 in an active state, in accordance with various embodiments. Ejection handle 106 may be configured to initiate an ejection sequence upon actuation. For example, occupant 16 pulling ejection handle 106 in the direction of arrow 110 may activate the rocket catapult assembly 200. Rocket catapult assembly 200 may comprise a mortar assembly 202, a breech 204, a catapult cartridge unit 205, a nozzle assembly 208, and a mortar cap assembly 210. In response to activation, the catapult cartridge unit 205 may ignite and tend to produce relatively hot, high pressure, gas. Breech 204 may be coupled to the aircraft 12 and comprise a mortar tube 206 disposed within the mortar assembly 202. In various embodiments, mortar cap assembly 210 may direct a first portion of gas to the breech 204 tending thereby to drive the mortar tube 206 outward of the mortar assembly 202 and cause ejection seat 14 to be expelled from cockpit 18. In various embodiments, mortar tube 206 may separate from the mortar assembly 202 in response to ejection seat 14 departing from the cockpit 18. In various embodiments, the breech 204 may include an integral gas generator which, in response to activation, may drive the mortar tube 206 outward of the mortar assembly 202 and cause ejection seat 14 to be expelled from cockpit 18. In various embodiments, the mortar assembly 202 may be ignited in response to mortar tube 206 exiting the mortar assembly 202.

Figure 3:
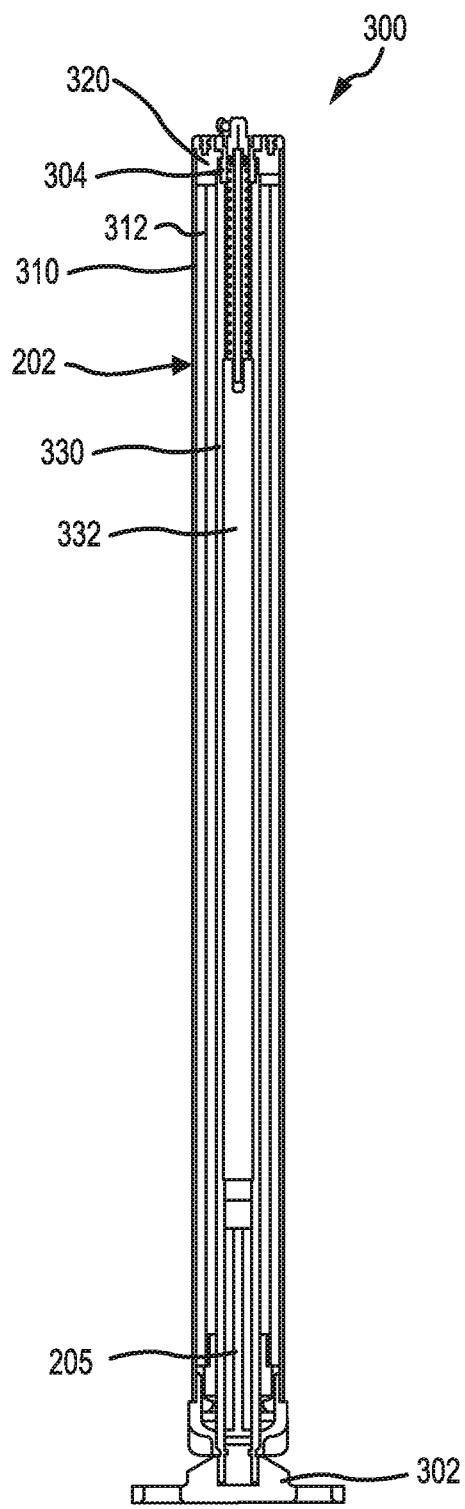
FIG. 3 illustrates a cross-sectional portion of a rocket catapult assembly, in accordance with various embodiments.

Referring now to FIG. 3, a cross-section of a portion of a rocket catapult assembly 300 in an inactive state, in accordance with various embodiments, is illustrated. The rocket catapult assembly 300 may comprise a proximal end 302 and a distal end 304 disposed opposite the proximal end 302. The proximal end 302 may be configured to be coupled to an aircraft (e.g., aircraft 12 from FIG. 1A), The distal end 304 may be configured to be coupled to an ejection seat (e.g., ejection seat 14 from FIG. 1A) The rocket catapult assembly 300 may further comprise a mortar outer case 310 extending from proximal end 302 to distal end 304, a head cap 320 coupled to the mortar outer case 310 at distal end 304, and a mortar inner case 330 disposed radially inward from mortar outer case 310. The head cap 320 may be coupled to the mortar outer case 310 by any method known in the art, such as a lock ring, or the like. In various embodiments, the mortar inner case 330 defines a chamber 332. The chamber 332 may be in fluid communication with a mortar cap assembly (e.g., mortar cap assembly 210 in FIG. 2).

Figure 4:
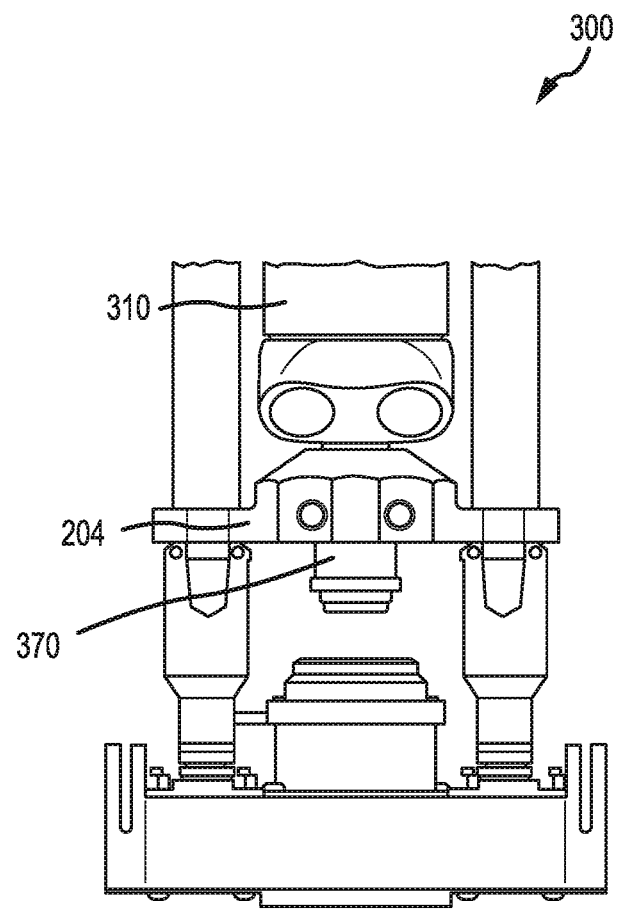
FIG. 4 illustrates a side view of a portion of a rocket catapult assembly, in accordance with various embodiments.

Referring now to FIG. 4, a side view of a portion of a rocket catapult assembly 300, in accordance with various embodiments, is illustrated. The rocket catapult assembly 300 further comprises a drive motor 370 coupled to the breech 204 opposite the mortar outer case 310. The drive motor 370 may be configured to translate a shaft of the drive motor 370 along the axis of the mortar outer case 310. The shaft of the drive motor 370 may be configured to drive a metering tube disposed in the mortar outer case 310 and/or adjust a launch force of the rocket catapult assembly 300.

Figure 5:
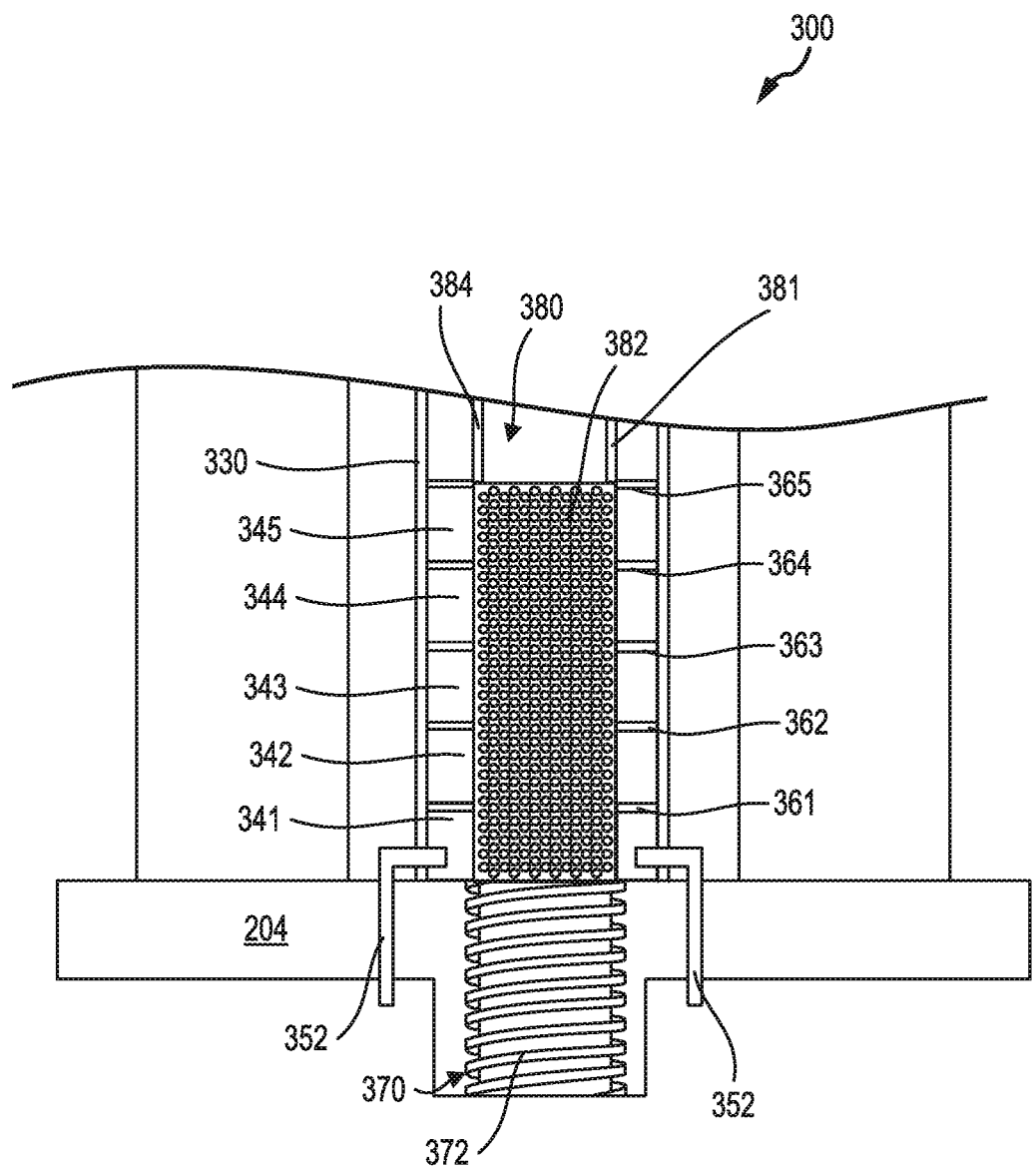
FIG. 5 illustrates a schematic of a portion of a rocket catapult assembly, in accordance with various embodiments.

Referring now to FIG. 5, a schematic view of a portion of a rocket catapult assembly 300, in accordance with various embodiments, is illustrated. In various embodiments, the drive motor 370 further comprises a drive shaft 372. The drive motor 370 may be configured to drive shaft 372 linearly along an axis defined by a centerline of mortar inner case 330. The drive shaft 372 may be coupled to a metering tube 380. The metering tube 380 may include an outer wall 381. The outer wall 381 may have a first section 382 (e.g., a gas pervious section) and a second section 384 (e.g., a gas impervious section). The first section 382 of the metering tube 380 is gas pervious and the second section 384 of metering tube 380 is gas impervious. For example, first section 382 may include a plurality of apertures disposed through metering tube 380. First section 382 of metering tube 380 may be disposed between second section 384 of metering tube 380 and drive shaft 372 of drive motor 370. The second section 384 of metering tube 380 may extend into the mortar inner case 330. The metering tube 380 may be configured to actuate with the drive shaft 372.

In various embodiments, a rocket catapult assembly 300 may further comprise, a first cartridge 341, a second cartridge 342, an igniter 352. In various embodiments, the igniter 352 may be any igniter known in the art, such as a pyrotechnic igniter, a low current igniter, or the like. The igniter 352 may be configured to ignite first cartridge 341. The first cartridge 341 may be disposed within mortar inner case 330 proximate the breech 204. The first cartridge 341 may be annular in shape. The first cartridge 341 may be disposed radially outward of metering tube 380. The first cartridge 341 may be disposed between a radial inner surface of mortar inner case 330 and a radially outer surface of metering tube 380.

In various embodiments, the rocket catapult assembly 300 further comprises a separation disk 361 disposed between the first cartridge 341 and the second cartridge 342. The separation disk 361 is configured to isolate first cartridge 341 from second cartridge 342 in an axial direction. First cartridge 341 and second cartridge 342 may be fluidly coupled when the first section 382 of metering tube 380 is adjacent to the first cartridge 341 and the second cartridge 342, as shown in FIG. 5. In various embodiments, when the first section 382 is disposed adjacent to the first cartridge 341 and the second section 384 is disposed adjacent to the second cartridge 342, then only the first cartridge 341 may ignite upon activation of the rocket catapult assembly 300 as second cartridge 342 may be fluidly isolated from first cartridge 341.

In various embodiments, the rocket catapult assembly 300 further comprises a third cartridge 343, a fourth cartridge 344 and/or a fifth cartridge 345. The third cartridge 343 may be axially adjacent to the second cartridge 342 and the fourth cartridge 344. The fourth cartridge 144 may be axially adjacent to the third cartridge 343 and fifth cartridge 345. Each cartridge may be separated from an adjacent cartridge by a separation disk. For example, a second separation disk 362 may be disposed axially between the second cartridge 342 and the third cartridge 343, a third separation disk 363 may be disposed axially between the third cartridge 343 and the fourth cartridge 344, and/or a fourth separation disk 364 may be disposed axially between the fourth cartridge 344 and the fifth cartridge 145. In various embodiments, a fifth separation disk 365 may be disposed axially distal to the fourth separation disk 364 and adjacent to the fifth cartridge 345. Although illustrated with five cartridges, any number of cartridges is within the scope of this disclosure.

In various embodiments, the number of cartridges ignited by the igniter 352 is based on an occupant weight in an aircraft. For example, for a relatively lightweight occupant, on first cartridge 341 may be ignited. For a relatively average weight occupant, the first cartridge 341, the second cartridge 342, and the third cartridge 343 may be ignited. For a relatively heavy occupant, all cartridges (e.g., the first cartridge 341, the second cartridge 342, the third cartridge 343, the fourth cartridge 344, and the fifth cartridge 345) may be ignited. For an occupant between relatively light weight and relatively average weight (e.g., between 100 lbs. (45 kg) and 150 lbs. (68 kg)), only the first cartridge 341 and the second cartridge 342 may be ignited. For an occupant between relatively average weight and relatively heavy weight (e.g., between 150 lbs. (68 kg) and 200 lbs. (91 kg)), the first cartridge 341, the second cartridge 342, the third cartridge 343, and the fourth cartridge 344 may be ignited. In various embodiments, the number of cartridges ignited by the igniter 352 may be based on an axial position of metering tube 380. For example, still referring to FIG. 5, rocket catapult assembly 300 configured to launch a relatively heavy weight occupant is illustrated, in accordance with various embodiments (i.e., all five cartridges are fluidly coupled as each cartridge is aligned with the first section 382 of metering tube 380).

In various embodiments, first cartridge 341 may be sized to provide a first thrust in proportion to a lightweight occupant. The total number of cartridges five cartridges as shown in FIG. 5) together may be sized to provide a second thrust in proportion to a heavy occupant. The number of cartridges may correspond to the number of weight settings and/or a number of thrust options. For example, five cartridges may correspond to five weight settings (e.g., light weight, between light weight and average weight, average weight, between average weight and heavy weight, and heavy weight). Similarly, five cartridges may correspond to five thrust settings where the greater number of cartridges ignited corresponding to a greater thrust value.

Figure 6:
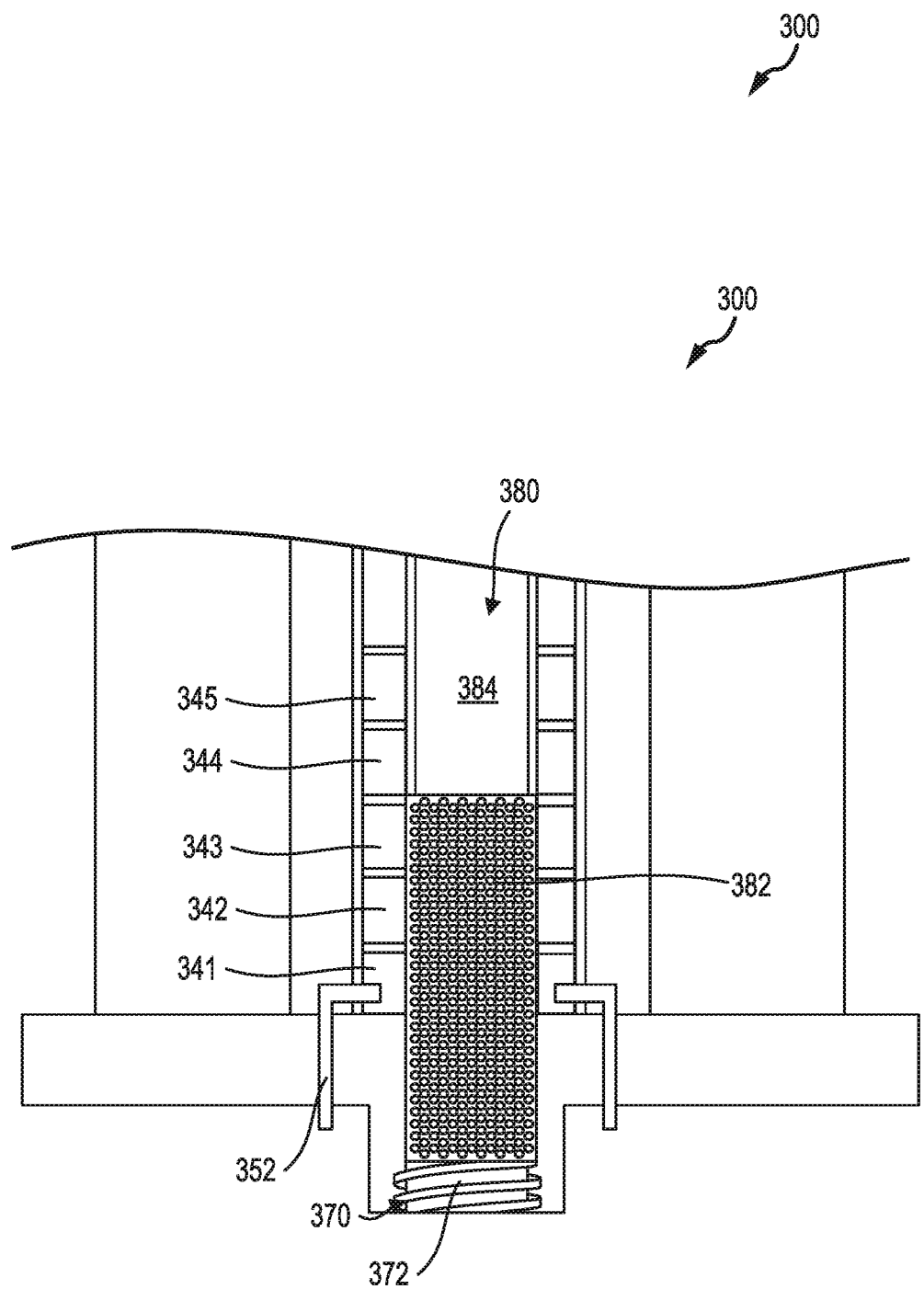
FIG. 6 illustrates a schematic of a portion of a rocket catapult assembly, in accordance with various embodiments.

Referring now to FIG. 6, a rocket catapult assembly 300 configured to launch a relatively average weight occupant, in accordance with various embodiments, is illustrated. For example, for an average weight occupant, first cartridge 341, second cartridge 342, and third cartridge 343 may be disposed adjacent to the first section 382 of the metering tube 380. In contrast, fourth cartridge 344 and fifth cartridge 345 may be disposed adjacent to the second section 384. The second section 384 may be configured to seal fourth cartridge 344 and fifth cartridge 345. Since the first section 382 is gas pervious, first cartridge 341, second cartridge 342, and third cartridge 343 may be in fluid communication with each other. Upon igniting first cartridge 341 with igniter 352, the first cartridge 341, the second cartridge 342, and the third cartridge 343 may ignite.

In various embodiments, rocket catapult assembly may transition from an average weight occupant launch configuration (as shown in FIG. 6) to a heavy weight occupant launch configuration (as shown in FIG. 5) via drive motor 370. For example, drive motor 370 may receive an electrical signal indicating a heavy weight occupant launch configuration is desired. In response, the drive motor may translate the drive shaft 372 axially towards the metering tube 380 and translate the metering tube 380. The drive motor 370 may be configured to translate the drive shaft a predetermined distance and ensure that all five cartridges are disposed adjacent to the first section 382 (i.e., the gas pervious section) of the metering tube 380. As such, all five cartridges may be in fluid communication and/or may be configured to ignite upon ignition of the first cartridge 341 from igniter 352.

Figure 7:
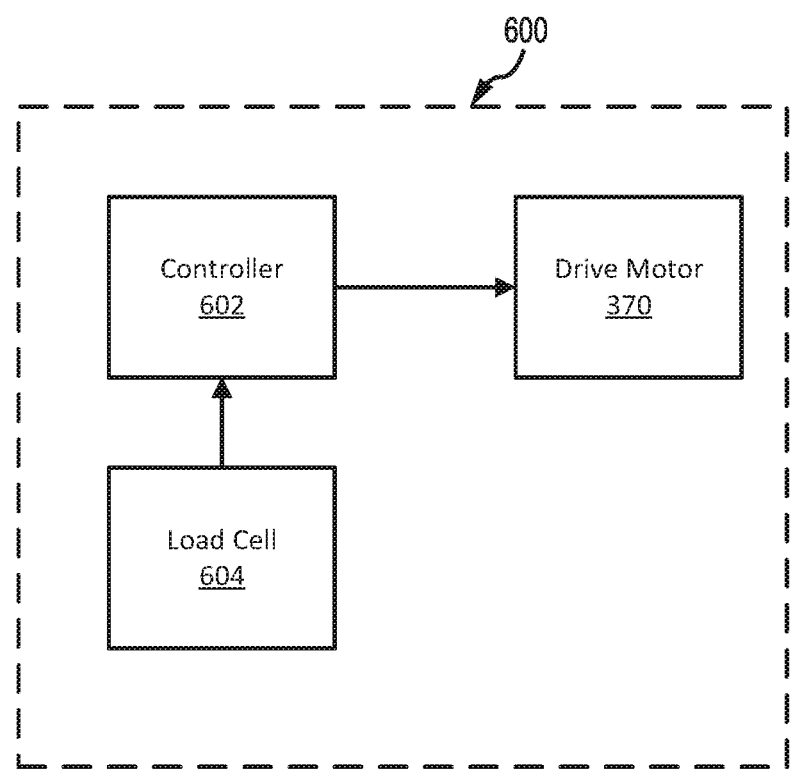
FIG. 7 illustrates a control system for a cartridge selection in a rocket catapult assembly, in accordance with various embodiments.
Figure 8:
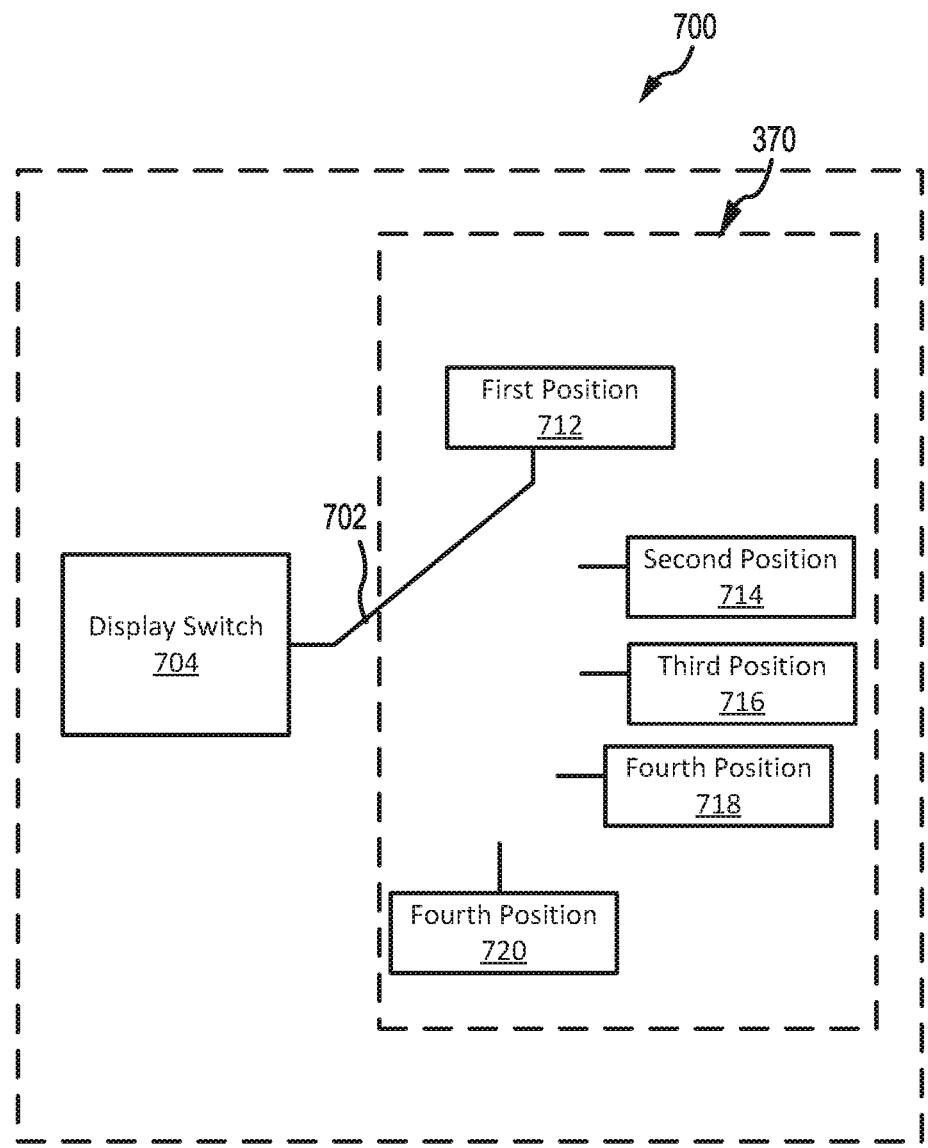
FIG. 8 illustrates a control system for a cartridge selection in a rocket catapult assembly, in accordance with various embodiments.

In various embodiments and with additional reference to FIG. 7, a schematic block diagram of a control system 600 for drive motor 370 is illustrated. Control system 600 includes a controller 602 in electronic communication with a load cell 604 and the drive motor 370. In various embodiments, controller 602 may be integrated into computer systems onboard aircraft 12 and/or ejection seat 14. In various embodiments, controller 602 may be configured as a central network element or hub to access various systems, engines, and components of control system 600. Controller 602 may comprise a network, computer-based system, and/or software components configured to provide an access point to various systems, engines, and components of control system 600. In various embodiments, controller 602 may comprise a processor. In various embodiments, controller 602 may be implemented in a single processor. In various embodiments, controller 602 may be implemented as and may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. Controller 602 may comprise a processor configured to implement various logical operations in response to execution of instructions, for example, instructions stored on a non-transitory, tangible, computer-readable medium configured to communicate with controller 602.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, controller 602 may be in electronic communication with load cell 604. Load cell 604 may be disposed in seat pan 108. Load cell 604 may comprise any load cell known in the art, such as a compression load cell, or the like. Load cell 604 may be configured to measure a weight of an occupant 16. Load cell 604 may be configured to transmit measurements to controller 602, thereby providing the measured weight of the occupant 16 to controller 602.

In various embodiments, controller 602 may receive a weight measurement from the load cell. With combined reference to FIGS. 5 and 7, in response to the weight measurement, the controller 602 may command the drive motor to retract or deploy the drive shaft 372 of the drive motor 370. In various embodiments, when the load cell 604 measures a weight of an occupant that is less than a first threshold weight, the controller may retract or deploy the drive shaft to a first position. The first position may correspond to first section 182 of a metering tube 180 being disposed adjacent to first cartridge 141 and second section 184 of metering tube 180 being disposed adjacent to second cartridge 142, third cartridge 143, fourth cartridge 144, and fifth cartridge 145.

In various embodiments, when the load cell 604 measures a weight of an occupant that is greater than the first threshold weight and less than a second threshold weight, the controller 602 may retract or deploy the drive shaft to a second position. The second position may correspond to first section 182 of a metering tube 180 being disposed adjacent to first cartridge 141 and second cartridge 142 and second section 184 of metering tube 180 being disposed adjacent to third cartridge 143, fourth cartridge 144, and fifth cartridge 145.

In various embodiments, when the load cell 604 measures a weight of an occupant that is greater than the second threshold weight and less than a third threshold weight, the controller 602 may retract or deploy the drive shaft to a third position. The third position may correspond to first section 182 of a metering tube 180 being disposed adjacent to first cartridge 141, second cartridge 142, and third cartridge 143 and second section 184 of metering tube 180 being disposed adjacent to fourth cartridge 144 and fifth cartridge 145.

In various embodiments, when the load cell 604 measures a weight of an occupant that is greater than the third threshold weight and less than a fourth threshold weight, the controller 602 may retract or deploy the drive shaft to a fourth position. The fourth position may correspond to first section 182 of a metering tube 180 being disposed adjacent to first cartridge 141, second cartridge 142, third cartridge 143, and fourth cartridge 144 and second section 184 of metering tube 180 being disposed adjacent to fifth cartridge 145.

In various embodiments, when the load cell 604 measures a weight of an occupant that is greater than the fourth threshold weight, the controller 602 may retract or deploy the drive shaft to a fourth position. The fourth position may correspond to first section 182 of a metering tube 180 being disposed adjacent to first cartridge 141, second cartridge 142, third cartridge 143, and fourth cartridge 144, and fifth cartridge 145.

In various embodiments, the first position corresponds to a thrust associated with a relatively lightweight occupant, the third position corresponds to a thrust associated with a relatively average weight occupant, and the fifth position corresponds to a thrust associated with a relatively heavy weight occupant. The second position corresponds to an occupant between relatively lightweight and relatively average weight, and the fourth position corresponds to an occupant between relatively average weight and relatively heavy weight. Any number of cartridges and positions are within the scope of this disclosure.

In this regard and by controlling which cartridges in the rocket catapult assembly 300 as a function of an occupant weight, an occupant 16 of an aircraft 12 may be ejected at a force based on the weight of the occupant 16, as opposed to a maximum weight of an occupant.

With reference now to FIG. 7, a schematic block diagram of a control system 700 for drive motor 370, in accordance with various embodiments, is illustrated. In various embodiments, control system 700 comprises a display switch 704 and drive motor 370. The display switch 704 may be disposed in a cockpit of aircraft 12 and electrically or energetically coupled to the drive motor 370 via an electrical switch 702. Display switch 704 may comprise five positions (e.g., a first position 712, a second position 714, a third position 716, a fourth position 718, and a fifth position 720). In various embodiments, the electrical switch 702 may be configured to deploy or retract a drive shaft of a drive motor 370 in accordance with the position selected. Each position may correspond to a weight of a person. For example, the first position 712 corresponds to a drive shaft position associated with a relatively lightweight occupant, the third position 716 corresponds to a drive shaft position associated with a relatively average weight occupant, and the fifth position 720 corresponds to a thrust associated with a relatively heavy weight occupant. The second position 714 corresponds to an occupant between relatively lightweight and relatively average weight, and the fourth position 718 corresponds to an occupant between relatively average weight and relatively heavy weight. Any number of cartridges and positions are within the scope of this disclosure.

The drive motor 370 may be configured to deploy or retract the drive shaft 372 in response to whichever position is enabled. For example, if display switch is changed from first position 712 to second position 714, the drive shaft may deploy from first position (i.e., a first position 712 where only first cartridge 341 is in fluid communication with the metering tube 380 to a second position 714 where only the first cartridge 341 and the second cartridge 342 are in fluid communication with the metering tube 380).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C. B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A rocket catapult assembly for use in an ejection seat system of an aircraft, comprising:
   a drive motor including a drive shaft;
   a metering tube coupled to the drive shaft, the metering tube including an outer wall having a gas pervious section and a gas impervious section;
   a first cartridge disposed radially outward of the metering tube;
   a second cartridge disposed axially adjacent to the first cartridge; and
   a separation disk disposed between the first cartridge and the second cartridge.

2. The rocket catapult assembly of claim 1, further comprising a mortar inner case defining a chamber, wherein the drive motor is configured to translate the drive shaft and the metering tube along an axis defined by a centerline of the mortar inner case.

3. The rocket catapult assembly of claim 2, wherein the gas pervious section is disposed adjacent to the first cartridge and the gas impervious section is disposed adjacent to the second cartridge in a first configuration, and wherein the gas pervious section is disposed adjacent to the first cartridge and the second cartridge in a second configuration.

4. The rocket catapult assembly of claim 3, wherein the first configuration corresponds to a first thrust of the rocket catapult assembly, wherein the second configuration corresponds to a second thrust of the rocket catapult assembly, and wherein the second thrust is greater than the first thrust.

5. The rocket catapult assembly of claim 3, wherein the first cartridge is in fluid communication with the chamber in the first configuration, and wherein the second cartridge is fluidly isolated from the chamber in the first configuration.

6. The rocket catapult assembly of claim 1, further comprising an igniter coupled to the first cartridge.

7. The rocket catapult assembly of claim 1, wherein the first cartridge and the second cartridge are annular in shape.

8. An aircraft ejection seat system comprising:
   a seat pan;
   a seat back coupled to the seat pan; and
   a rocket catapult assembly coupled to the seat back, the rocket catapult assembly comprising:

a mortar assembly comprising a mortar outer casing and a mortar inner casing extending from a proximal end to a distal end, the mortar inner casing defining a chamber;

a drive motor including a drive shaft;

a metering tube coupled to the drive shaft; the metering tube including an outer wall having a gas pervious section and a gas impervious section, wherein the metering tube is configured to alter a thrust of the rocket catapult assembly based on an axial alignment of the metering tube.

9. The aircraft ejection seat system of claim 8, further comprising:

a first cartridge disposed radially outward of the metering tube;

a second cartridge disposed axially adjacent to the first cartridge; and a separation disk disposed between the first cartridge and the second cartridge.

10. The aircraft ejection seat system of claim 9, further comprising a display switch configured to be in a first position and a second position, wherein the display switch is configured to create a first electrical connection and align the gas pervious section with the first cartridge and the gas impervious section with the second cartridge in response to being in the first position, wherein the display switch is configured to create a second electrical connection and align the gas pervious section with the first cartridge and the second cartridge in response to being in the second position.

11. The aircraft ejection seat system of claim 9, further comprising a load cell coupled to the seat pan.

12. The aircraft ejection seat system of claim 11, further comprising a controller in electrical communication with the load cell and the drive motor.

13. The aircraft ejection seat system of claim 12, wherein the controller is configured to align the gas pervious section with the first cartridge only when a weight below a first threshold weight is measured by the load cell.

14. The aircraft ejection seat system of claim 13, wherein the controller is configured to align the gas pervious section with the first cartridge and the second cartridge when the weight is measured by the load cell as being above a second threshold weight, wherein the second threshold weight is greater than the first threshold weight.

15. The aircraft ejection seat system of claim 9, further comprising a third cartridge disposed axially adjacent to the second cartridge.

16. The aircraft ejection seat system of claim 9, further comprising a breech, the drive motor coupled to the breech.

17. A method of controlling an operating pressure of a rocket catapult assembly for an ejection seat of an aircraft, the method comprising:

compressing a load cell disposed in a seat pan of the ejection seat;

aligning a gas pervious section of an outer wall of a metering tube with a first cartridge, the first cartridge disposed radially outward from the metering tube; and aligning a gas impervious section of the outer wall of the metering tube with a second cartridge in response to the load cell measuring a weight below a first weight threshold.

18. The method of claim 17, further comprising aligning the gas pervious section with the first cartridge and the second cartridge in response to the weight being above the first weight threshold.

19. The method of claim 18, further comprising aligning the gas impervious section with a third cartridge in response to the weight being above the first weight threshold and below a second weight threshold.

20. The method of claim 19, further comprising aligning the gas pervious section with the first cartridge, the second cartridge, and the third cartridge in response to the weight being above the second weight threshold.

\* \* \* \* \*